United States Patent [19]

Makowski, deceased et al.

[11] 4,304,702

[45] Dec. 8, 1981

[54] PROCESS FOR CONTROLLED GELATION OF POLYMERIC SOLUTION

[75] Inventors: Henry S. Makowski, deceased, late of Scotch Plains, N.J., by Patricia H. Makowski, executrix; Robert D. Lundberg, Bridgewater, N.J.

[73] Assignee: Exxon Research & Engineering Co., Florham Park, N.J.

[21] Appl. No.: 136,836

[22] Filed: Apr. 3, 1980

[51] Int. Cl.[3] .............................................. C08F 8/36
[52] U.S. Cl. ..................... 260/29.6 SQ; 260/29.6 PM; 525/344
[58] Field of Search ..................... 260/29.6 E, 29.6 N, 260/29.6 PM, 29.6 SQ, DIG. 31; 525/344

[56] References Cited

U.S. PATENT DOCUMENTS

| | | | |
|---|---|---|---|
| 2,809,959 | 10/1957 | Roth | 260/29.6 SQ |
| 2,813,087 | 11/1957 | Roth | 525/344 |
| 3,554,287 | 1/1971 | Eilers | 260/29.2 EP |
| 3,870,841 | 3/1975 | Makowski | 260/DIG. 31 |
| 4,157,432 | 6/1979 | Lundberg | 525/344 |
| 4,226,751 | 10/1980 | Lundberg | 260/DIG. 31 |

*Primary Examiner*—Paul R. Michl
*Attorney, Agent, or Firm*—Richard E. Nanfeldt

[57] ABSTRACT

The present invention relates to a process for forming a polymeric solution or gel having a viscosity of at least about 50,000 cps which includes the steps of dissolving an amine neutralized sulfonated polymer in a solvent to form a polymeric solution, a concentration of the amine neutralized sulfonated polymer in the solution being about 0.1 to about 20 wt. %, a viscosity of the solution being less than about 20,000 cps; and adding about 1 to about 500 vol. % of an inorganic base solution to the polymeric solution having a viscosity less than about 20,000 cps, the water of the inorganic base solution being immiscible with the solvent and the polymeric solution, the viscosity of said polymeric solution increasing rapidly upon the addition of said inorganic base solution from less than 20,000 cps to greater than 50,000 cps.

30 Claims, No Drawings

PROCESS FOR CONTROLLED GELATION OF POLYMERIC SOLUTION

BACKGROUND OF THE INVENTION

1. Field of the Invention

The present invention relates to a process for forming a polymeric solution or gel having a viscosity of at least about 50,000 cps which includes the steps of dissolving an amine neutralized sulfonated polymer in a solvent to form a polymeric solution, a concentration of the amine neutralized sulfonated polymer in the solution being about 0.1 to about 20 wt. %, a viscosity of the solution being less than about 20,000 cps; and adding about 1 to about 500 vol. % of inorganic base solution to the polymeric solution having a viscosity less than about 20,000 cps, the water of the inorganic base solution being immiscible with the solvent and the polymeric solution, the viscosity of said polymeric solution increasing rapidly upon the addition of said inorganic base solution from less than 20,000 cps to greater than 50,000 cps.

2. Description of the Prior Art

There are many applications for very viscous or gelled solutions of polymers in organic liquids which are quite diverse. There are also a number of physical and chemical techniques for preparing such systems. The present invention is concerned with a process for converting a relatively low viscosity organic liquid solution of an ionic polymer into a very viscous or gelled system via a rapid process which under certain conditions can be reversed. The potential applications for this process and the products derived therefrom will be evident in the instant application.

There are major problems in the direct preparation of viscous polymer solutions or gels via conventional techniques such as polymer dissolution. For example, attempts to form a high viscosity (>500,000 cps) solution of polystyrene in a suitable solvent such as xylene can be difficult. The levels of polymer required are either very high (20 to 50 wt. % concentration) or the molecular weight of the polymer must be extremely high. In either event the dissolution process is extremely slow even at elevated temperatures, and even then it is difficult to achieve homogeneous polymer solutions free of local concentrations of undissolved, or poorly dissolved polymer. Thus, the process of achieving such solutions can be difficult and the concentration of polymer in the solution to achieve high viscosities can be uneconomically high.

These are various chemical approaches to the solution of the problems outlined above, that is polymer chain lengthening reactions which can occur to give viscous solutions such as by the reaction of hydroxyl terminated polymers with diisocyanates etc. Such processes have inherent disadvantages which preclude their use in the intended applications of this invention.

The instant invention describes a process which permits (1) the preparation of polymer solutions of sulfonated polymers in organic liquid having reasonably low viscosities (i.e., less than about 20,000 cps), (2) the preparation of extremely viscous solutions or gels from such solutions by the simple process of mixing a suitable basic solution with the polymer solution and (3) the reversion of such viscous solutions or gels to relatively low viscosity mixtures by the reincorporation of polar cosolvents which are water immiscible at a desired stage. These operations are achieved by the use of the appropriate concentration of polymers having low concentrations of ionic groups present, preferably metal sulfonate groups. Such polymers are described in detail in a number of U.S. patents (U.S. Pat. Nos. 3,836,511; 3,870,841; 3,847,854; 3,642,728; 3,921,021) which are herein incorporated by reference. These polymers possess unusual solution characteristics some of which are described in U.S. Pat. No. 3,931,021. Specifically such polymers such as lightly sulfonated polystyrene containing about 2 mole % sodium sulfonate pendant to the aromatic groups are typically not soluble in solvents commonly employed for polystyrene itself. However, the instant invention describes a select class of amine neutralized sulfonated polymers which readily dissolve in selected solvents. The sulfonate groups of the sulfonated polymers are neutralized with a secondary or tertiary amine having at least 6 carbon atoms.

The remarkable and surprising discovery of the instant invention pertains to the following observation.

When small (or large) amounts of base are combined and mixed with solutions of the critically selected ionic polymers dissolved in the solvent as those described above, it is possible to convert such low viscosity systems into extremely viscous gels or solutions. Indeed it is possible to achieve increases in viscosity by factors of $10^4$ (10,000) or more by the addition of only 5 to 15% water based on the polymer solution volume.

This unusual behavior is postulated to arise from the reaction of the aqueous base with the amine neutralized sulfonated polymer and the consequent development of stronger ionic associations. Consequently, when this occurs the physical crosslinking of the ionic groups is again manifested resulting in a tremendous increase in solution viscosity. The resulting gels or thick solutions appear quite homogeneous.

SUMMARY OF THE INVENTION

The present invention relates to a process for forming a viscous polymeric solution or gel having a viscosity of at least about 50,000 cps which includes the steps of dissolving an amine neutralized sulfonated polymer in a solvent to form a polymeric solution, a concentration of the amine neutralized sulfonated polymer in the polymeric solution being about 0.1 to about 20 wt. %, a viscosity of the polymeric solution being less than about 20,000 cps; and adding about 1 to about 500 vol. % of an inorganic base solution to the polymeric solution having a viscosity less than about 20,000 cps, the viscosity of said polymeric solution increasing rapidly upon the addition of the inorganic base solution from less than 20,000 cps to greater than 50,000 cps.

Accordingly, it is a primary object of the instant invention to describe an economical process for forming a highly viscous or gelled polymeric solution having a viscosity greater than about 50,000 cps, preferably greater than 500,000 cps.

A further object of the instant invention is to provide a process for forming a gel solution which can be used as an encapsulating material, a coating material, as a means of forming a plug within a bore of an elongated member, or as a means of filling an opening in an article. In addition, this technique can be employed as an approach to join lubricating gels or greases which display a significant resistance to flow.

A still further object of the instant invention is to employ the instant process as an integral part of well control procedures which are initiated when unwanted pore fluid influxes have entered the wellbore from subterranean formations. A thin fluid solution, separated from the water base drilling mud by suitable fluid spacers, could be circulated down the drill pipe string and out through the jet nozzles in the drill bit. Upon contacting water in the drill pipe-formation annulus, a viscous gel would be formed that could prevent further pore fluid movement and avoid the risk of a catastrophic well blowout. This type of procedure would have several advantages over current, conventional well control methods which rely on the hydrostatic gradient of a heavy fluid placed in the annulus to control the well in the event of pore fluid influxes.

GENERAL DESCRIPTION

The present invention relates to a process for forming a polymeric solution having a viscosity of at least about 50,000 cps which includes the steps of dissolving an amine, an unneutralized or neutralized sulfonated polymer in a solvent to form a polymeric solution, a concentration of the amine neutralized sulfonated polymer in the polymeric solution being about 0.1 to about 20 wt. %, a viscosity of the polymeric solution being less than about 20,000 cps; and adding about 1 to about 500 vol. % of an inorganic solution to the polymer solution having a viscosity less than about 20,000 cps, the viscosity of said polymeris solution increasing rapidly upon the addition of the inorganic base solution from less than 20,000 cps to greater than 50,000 cps.

When the solution having a viscosity greater than 50,000 cps is formed by the addition of inorganic base solution to the polymeric solution having a viscosity less than 20,000 cps, the metal sulfonate groups provide strong ionic interactions which either increases solution viscosity or can actually cause gellation. The formation of the polymeric solution having a viscosity of 500,000 cps from the polymeric solution having a viscosity less than 20,000 cps can be quite rapid in the order of less than 1 minute to about 24 hours, more preferably less than 1 minute to about 30 minutes, and most preferably less than 1 minute to about 10 minutes; however, this depends on temperature, shear, solvent type, type of amine employed as neutralization agent, etc.

The component mateerials of the instant process generally include an amine neutralized ionomeric polymer such as a trialkyl amine sulfonated polymer, an organic solvent for said polymer and a suitable inorganic base.

The amine employed as neutralization agent is an alkyl or aromatic substituted amine, preferably a secondary or tertiary amine which is substituted by two alkyl or aromatic radicals or a combination of an alkyl and aromatic radical, and most preferably a trisubstituted amine where alkyl or aromatic radicals or combinations of both aromatic and alkyl groups are involved. The tertiary amines are most preferred because they display the least ionic associations in an organic solvent. Consequently, a sulfonated polymer neutralized with tertiary amines will display rather low levels of ionic associations, and therefore low solution viscosities when dissolved in a broad spectrum of organic solvents.

Similarly, secondary amines are somewhat more strongly associating than tertiary amines, but still meet the objectives and the spirit of the instant invention. The least preferred amine which falls within this invention are primary amines which display a significant degree of ionic association. Not encompassed within this invention are the ammonium salts because they exhibit a degree of association which is sufficiently strong that the polymers are either not truly soluble in the preferred organic solvents, or they display undesirably high viscosities.

In general, the ionomeric polymer will comprise from about 10 to about 300 meq. pendant ionomeric groups per 100 grams of polymer, more preferably from 10 to 200 meq. pendant ionomeric groups. The ionic groups may be conveniently selected from the group consisting of carboxylate, phosphonate, and sulfonate, preferably sulfonate groups. The ionomers utilized in the instant invention are neutralized with the basic materials selected from primary, secondary and tertiary amines having at least 6 carbon atoms, more preferably secondary and tertiary amines with at least 8 carbon atoms. Ionic polymers which are subject to the process of the instant invention are illimitable and include both plastic and elastomeric polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated butyl rubber, sulfonated polyisoprene, and sulfonated elastomers and their copolymers.

The neutralization of the cited polymers with the selected amine hydroxide, oxide or critically selected amine salts can be conducted by means well known in the art. For example, the sulfonation process as with butyl rubber containing a small 0.3 to 1.0 mole % unsaturation can be conducted in a suitable solvent such as toluene with acetyl sulfate as the sulfonating agent such as described in U.S. Pat. No. 3,836,511. The resulting sulfonic acid derivative can then be neutralized with a number of different amine neutralization agents such as dibutylamine. The amounts of such amine neutralization agents employed will normally be equal stoichiometrically to the amount of free acid in the polymer plus any unreacted reagent which still is present. It is preferred that the amount of amine neutralizing agent be equal to the molar amount of sulfonating agent originally employed plus 10% more to insure full neutralization. The use of more of such amine neutralization agent is not critical. Sufficient amine neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole % preferably 90 to 200%. Most preferably it is preferred that the degree of neutralization be substantially complete, that is with no substantial free acid present and without substantial excess of the base other than that needed to insure neutralization. Thus, it is clear that the polymers which are utilized in the instant invention comprise substantially amine neutralized pendant groups and, in fact, an excess of the amine neutralizing material may be utilized without defeating the objects of the instant invention.

The ionomeric polymers of the instant invention may vary in number average molecular weight from 1,000 to 10,000,000, preferably from 5,000 to 500,000 and most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones not be cross linked and (in the absence of the ionic groups) be soluble in the organic liquid whose viscosity is to be controlled. To achieve the desired solubility, it is required that the polymer to be employed possess a degree of polarity consistent with that solvent. This solubility relationship can readily be established by anyone skilled in the art simply by appropriate tests (e.g., Polymer Handbook, Edited by Brandrup and Emmergut, Interscience Publishers, 1967, section IV-341). In the absence of appropriate polymer-solvent compatibility knowledge, this can be determined experimentally by observing whether the selected polymer will be soluble in the solvent at a level of 1 gm. polymer per 100 ml solvent. If the polymer is soluble, then this demonstrates that it is an appropriate backbone for modification with ionic groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline.

The preferred ionic copolymers for use in the instant invention, e.g., sulfonated polystyrene and substituted derivatives thereof, may be prepared by the procedures described in U.S. Pat. No. 3,870,841, filed on Oct. 2, 1972, in the names of H. S. Makowski, R. D. Lundberg, and G. H. Singhal, hereby incorporated by reference.

The ionomeric polymers may be incorporated into the organic liquid at a level of from 0.1 to 20 weight % preferably from 0.2 to 10 weight %, most preferably from 0.5 to 5 weight % based on the organic liquid and the polar cosolvent.

Specific examples of preferred ionomeric polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated propylene copolymers, sulfonated styrene-methyl methacrylate copolymers, (styrene)acrylic acid copolymers, sulfonated polyisobutylene, sulfonated ethylene-propylene terpolymers, sulfonated butyl rubber, sulfonated polyisoprene, sulfonated polyvinyl toluene, and sulfonated polyvinyl toluene copolymers.

The ionomeric polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The amine neutralized polymer may then be isolated by means well known to those skilled in the art; i.e., coagulation, steam stripping, or solvent evaporation, because the amine neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation, since in situ neutralization required preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of an amine neutralized ionic polymer affords the maximum latitude in formulation, less problems in handling polymers of limited thermal stability and maximum control over the final mixture of ionic polymer, polar cosolvent and organic liquid.

The organic liquids, which may be utilized in the instant invention, are selected with relation to the ionic polymer and vice-versa. The organic liquid is selected from the group consisting essentially of aromatic hydrocarbons, ketones, chlorinated aliphatic hydrocarbons, aliphatic hydrocarbons, cyclic aliphatic ethers, aliphatic ethers, paraffinic oils, Diesel fuels, and organic aliphatic esters and mixtures thereof.

Specific examples of organic liquids to be employed with various types of polymers are:

| Polymer | Organic Liquid |
|---|---|
| sulfonated polystyrene | benzene, toluene, ethyl benzene, methylethyl ketone, xylene, styrene, ethylene dichloride, methylene chloride |
| sulfonated poly-t-butyl styrene | benzene, toluene, xylene, ethyl benzene styrene, t-butyl styrene, aliphatic oils, aromatic oils, hexane, heptane, decane, nonane, pentane |
| sulfonated ethylene-propylene terpolymer | aliphatic and aromatic solvents, oils such as Solvent "100 Neutral" "150 Neutral", and similar oils, benzene, diesel oil, toluene, xylene, ethyl benzene, pentane, hexane, heptane, octane, iso-octane, nonane, decane aromatic solvents, ketone solvents |
| sulfonated styrene-methyl-methacrylate copolymer | dioxane, halogenated aliphatics, e.g., methylene chloride, tetrahydrofuran |
| styrene-acrylic acid copolymers | aromatic solvents, ketone solvents, tetrahydrofuran, dioxane, halogenated aliphatics, e.g., methylene chloride |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons "Solvent 100 Neutral", "Solvent 150 Neutral" and all related oils, low molecular weight polymeric oils such as squalene, white oils and process oils having 60% or less aromatic content |
| sulfonated polyvinyl-toluene | toluene, benzene, xylene, cyclohexane, ethyl benzene, styrene, methylene, chloride, ethylene dichloride. |

The method of the instant invention includes adding an inorganic base solution to the polymeric solution of the amine neutralized sulfonated polymer whereby the amine counterion of the neutralized sulfonate groups undergo a cation exchange with the metal cations of the inorganic base solution. The inorganic base solution of the instant invention generally comprises a Group IA or IIA metal hydroxide or a Group IA, IIA, IB or IIB iron, lead, cobalt or nickel metal salt of a weak carboxylic acid such as acetic acid, propionic acid, hexanoic acid, etc., wherein the solvent for the inorganic base solution is preferably water. Other solvents for the desired base can be employed but they cannot be alcohols, acids, amines or similar agents which would strongly solvate the ionic groups, thereby breaking up the strong ionic association desired after the exchange has occurred. Selected solvents therefore must be suitable for the base, reasonably compatible with the polymer solvent, and not strongly disposed to interaction with the ionic groups. Typical examples of suitable compounds are sodium hydroxide, sodium acetate, zinc acetate, potassium hydroxide and barium hydroxide; also suitable is ammonium hydroxide. Most desirable are metal carboxylates which display some solubility in water and are readily dispersable in the polymer solvents.

The amount of inorganic base solution added to the solution of the amine neutralized sulfonated polymer and organic liquid having a viscosity of less than about 20,000 cps, is about 1 to about 500 vol. %, more preferably about 2 to about 20 vol. %, and most preferably about 5 to about 50 vol. % water.

DETAILED DESCRIPTION OF THE PREFERRED EMBODIMENTS

Example 1

A series of sulfonated polystyrenes were prepared using techniques described in previous patents (U.S. Pat. Nos. 3,870,841, and 3,842,154). The sulfonated polystyrene yields a polymer sulfonic acid of approximate sulfonic acid content of 2.7 mole % as measured by sulfur analysis, was neutralized with several different ammonium derivatives including ammonium hydroxide, n-butyl amine, and tri-n-butyl amine. The resulting polymers had the compositions as determined by sulfur analysis as shown below.

| Sample | Neutralization Agent | Composition (mole %)* |
|--------|----------------------|----------------------|
| A | ammonium hydroxide | 2.63 |
| B | n-butyl amine | 2.8 |
| C | tri-n-butyl amine | 2.5 |

Example 2

The preparation of solutions of 5 g (2% concentration) and 12.5 g (5% concentration) of 2.63 mole % sulfonated polystyrene (NH$_4$OH neutralized) was attempted by stirring at room temperature in 250 ml xylene producing swollen gel. With additional 10 ml hexane solutions were obtained with viscosities of 3.2 cps and 26.2 cps and those solutions were designated A-1 and A-2, respectively. The solution viscosities of the above solutions were determined using a Brookfield viscometer at 25° C.

The polymer solutions (50 ml) were then admixed under conditions of rapid shear with 5 ml of water in one case and 5 ml of 1 molar sodium hydroxide in another case. In the case of the 2% polymer solutions (A-1) in xylene/hexanol mixed solvent, the addition of water resulted in a phase separation with a small amount of a soft gel. In the case of sodium hydroxide addition, a small volume of dense, tough, white gel was formed. In both cases, a large volume of a thin supernatant liquid was present. The solution viscosities shown in Table I were obtained (A-1 and A-2). It is seen that the addition of water to the 5% NH$_4$OH-neutralized polymer results in an increase in solution viscosity while the addition of base provides a phase separated gel with a viscosity of 73,000 cps.

Example 3

The preparation of solutions of 5 g (2% concentration) and 12.5 g (5% concentration) of 2.8 mole % sulfonated polystyrene (n-butyl amine neutralized) was attempted by stirring at room temperature in 250 ml xylene producing partially dissolved polymer solution plus swollen gel. With the addition of 5 ml (2%) hexanol solutions were obtained with viscosities of 4.1 cps and 354 cps. The solutions were designated B-1 and B-2, respectively.

Following the procedure of Example 2, 50 ml of the solutions were admixed with 5 ml of water in one case and 5 ml of 1 molar sodium hydroxide in another case. At the lower polymer level (2%) it was observed that there was some phase separation of gel on the addition of water while there was a pronounced phase separation on the addition of the sodium hydroxide, at the higher polymer concentration (5%, solution B-2) the addition of water had relatively little effect on solution viscosity as shown in Table 1 while the addition of aqueous base resulted in a gel phase with an apparent viscosity of 633,000 cps. This experiment demonstrates the difference between using a basic aqueous solution and water in the effect on an amine neutralized sulfonated polymer solution.

Example 4

The preparation of solutions of 5 g (2% concentration) and 12.5 g (5% concentration) of 2.5 mole % sulfonated polystyrene (tri-n-butyl amine neutralized) was achieved by stirring at room temperature in 250 ml xylene resulting in homogeneous solutions with viscosities of 1.8 cps and 6.48 cps. The two solutions were designated C-1 and C-2, respectively. Following the procedure of Example 2, 50 ml aliquots of these solutions were admixed with 5 ml of water in one case and 5 ml of 1 molar sodium hydroxide in another case. The results are shown in Table I. In the case of the 2% polymer solution in xylene it is seen that the addition of water had virtually no effect on solution viscosity (a change of 1.8 cps to 1.82 cps) as shown for solution, C-1. In the case of the addition of aqueous sodium hydroxide there is a substantial increase of viscosity in the 2% polymer solution in xylene (1.8 cps to 21.2 cps). The resulting solution appeared somewhat milky in composition.

In the case of the 5% polymer solution, or C-2, the addition of the water resulted in only a modest change of viscosity, from 6.48 cps to 8.4 cps, suggesting no significant interaction. The addition of the sodium hydroxide solution, however, resulted in marked increase in viscosity to yield a gel with an apparent viscosity of 256,000 cps. Clearly, the interaction of base and polymer has resulted in a strong ionic association. After 6 days of standing, the gel was extremely strong and tough while some of the xylene had separated to form a non-viscous supernatant liquid.

TABLE I

Addition of Water or 1M NaOH to Solutions of Amine Neutralized Sulfonated Polystyrene*

| Solution | SPS neutralized with | Concentration of Polymer Wt. % | Solvent | Solution Visc. cps. | Addition of 10% H₂O | Addition of 1 M NaOH |
|---|---|---|---|---|---|---|
| A-1 | NH₄OH | 2% | 4% hexanol/xylene | 3.2 | Polymer gels and separates from solution | Polymer gels and separates from solution |
| A-2 | NH₄OH | 5% | 4% hexanol/xylene | 26.2 | 960 cps | Gel viscosity 73,000 cps and 10 ml xylene |
| B-1 | n-butyl amine | 2% | 2% hexanol/xylene | 4.1 | Partial polymer gel solution viscosity - 2.5 cps | Polymer gels and separates from solution |
| B-2 | n-butyl amine | 5% | 2% hexanol/xylene | 354 | 376 cps | Gel viscosity 633,000 cps and 16 ml xylene |
| C-1 | tri-n-butyl amine | 2% | xylene | 1.8 | 1.82 cps | 21.2 cps |
| C-2 | tri-n-butyl amine | 5% | xylene | 6.48 | 8.4 cps | Gel-viscosity 256,000 |

*Viscosities were measured at 25° C. employing a Brookfield viscometer and are shown as cps.

What is claimed is:

1. A process for forming a polymeric solution or water insoluble gel having a viscosity of at least about 50,000 cps which includes the steps of:
   (a) dissolving an amine neutralized sulfonated polymer in a solvent to form a polymeric solution, a concentration of said amine neutralized sulfonated polymer in said solution being about 0.1 to about 20 wt. %, a viscosity of said solution being less than about 20,000 cps; and
   (b) adding about 1 to about 500 vol. % of an inorganic base solution to said polymeric solution, the viscosity of said polymeric solution increasing upon the addition of said inorganic base solution from less than 20,000 cps to greater than 50,000 cps.

2. A process according to claim 1, further including heating said mixture of solutions to a temperature below the boiling point of said organic liquid thereby increasing the cation exchange rate.

3. The water insoluble gel prepared by the process of claim 2.

4. A process according to claim 1, including the inorganic base dissolved in water providing a mixture having a viscosity greater than 50,000 cps.

5. The water insoluble gel prepared by the process of claim 1.

6. The water insoluble gel prepared by the process of claim 4.

7. A process according to claim 4, further including suspending an article in said solution having a viscosity less than about 20,000 cps., thereby permitting said water insoluble gel to be encapsulated within said substance having a viscosity greater than 50,000 cps upon the addition of inorganic base solution to said solution having a viscosity less than about 20,000 cps.

8. The water insoluble gel prepared by the process of claim 7.

9. A process according to claim 1, further including an article having an opening therein and forming said solution having a viscosity greater than 50,000 cps within said opening.

10. A process according to claim 1, further including an elongated member having a bore therein and forming said solution having a viscosity greater than 500,000 cps within said bore.

11. A process according to claim 1, wherein said neutralized sulfonated polymer has about 10 to about 300 meq. of pendant sulfonate groups per 100 grams of polymer.

12. A process according to claim 11, wherein said sulfonate groups are neutralized with an amine counterion.

13. A process according to claim 12, wherein said amine is a primary, secondary or tertiary amine.

14. A process according to claim 12, wherein said amine is a tertiary amine.

15. A process according to claim 12, wherein said amine is a secondary amine.

16. A process according to claim 12, wherein said SO₃H groups are at least 90 mole % neutralized.

17. A process according to claim 1, wherein said neutralized sulfonated polymer is formed from an elastomeric polymer.

18. A process according to claim 17, wherein said elastomeric polymer is selected from the group consisting of EPDM terpolymer and butyl rubber.

19. A process according to claim 1, wherein said neutralized sulfonated polymer is formed from a thermoplastic.

20. A process according to claim 19, wherein said thermoplastic is selected from the group consisting of polystyrene, t-butyl styrene, and copolymers containing vinyl aromatic groups.

21. A process according to claim 1, wherein said neutralized sulfonated polymer further includes a filler admixed therewith.

22. A process according to claim 1, wherein said neutralized sulfonated polymer further includes a polymeric substance admixed therewith.

23. A process according to claim 1, wherein said organic liquid is selected from the group consisting of aromatic hydrocarbons, ketones, chlorinated aliphatic hydrocarbons, aliphatic hydrocarbons, cyclic aliphatic ethers, aliphatic ethers and organic aliphatic esters and mixtures thereof.

24. A process according to claim 1, wherein said organic liquid is selected from the group consisting of aliphatic hydrocarbons, diesel fuels, paraffinic oils and aromatic hydrocarbons.

25. A process according to claim 1, wherein said organic liquid is selected from the group including benzene, toluene, ethyl benzene, xylene and styrene and mixtures thereof.

26. A process according to claim 25, wherein said neutralized sulfonated polymer is formed from polystyrene.

27. The water insoluble gel prepared by the process of claim 26.

28. The process of claim 1 where the viscosity of the solution is less than 20,000 cps and increases with inorganic base solution addition to greater than 500,000 cps.

29. A process according to claim 1, wherein said organic liquid is selected from the group consisting of oils which are predominantly paraffinic in composition.

30. A process according to claim 1 or 13, wherein said inorganic base solution is formed from a Group IA and IIA metal hydroxide and a Group IA, IIA, IB, IIB, nickel, iron, lead and metal salt of a weak carboxylic acid.

* * * * *